J. C. EUBANK.
SCYTHE.
APPLICATION FILED FEB. 9, 1917.
1,265,635.
Patented May 7, 1918.
2 SHEETS—SHEET 2.
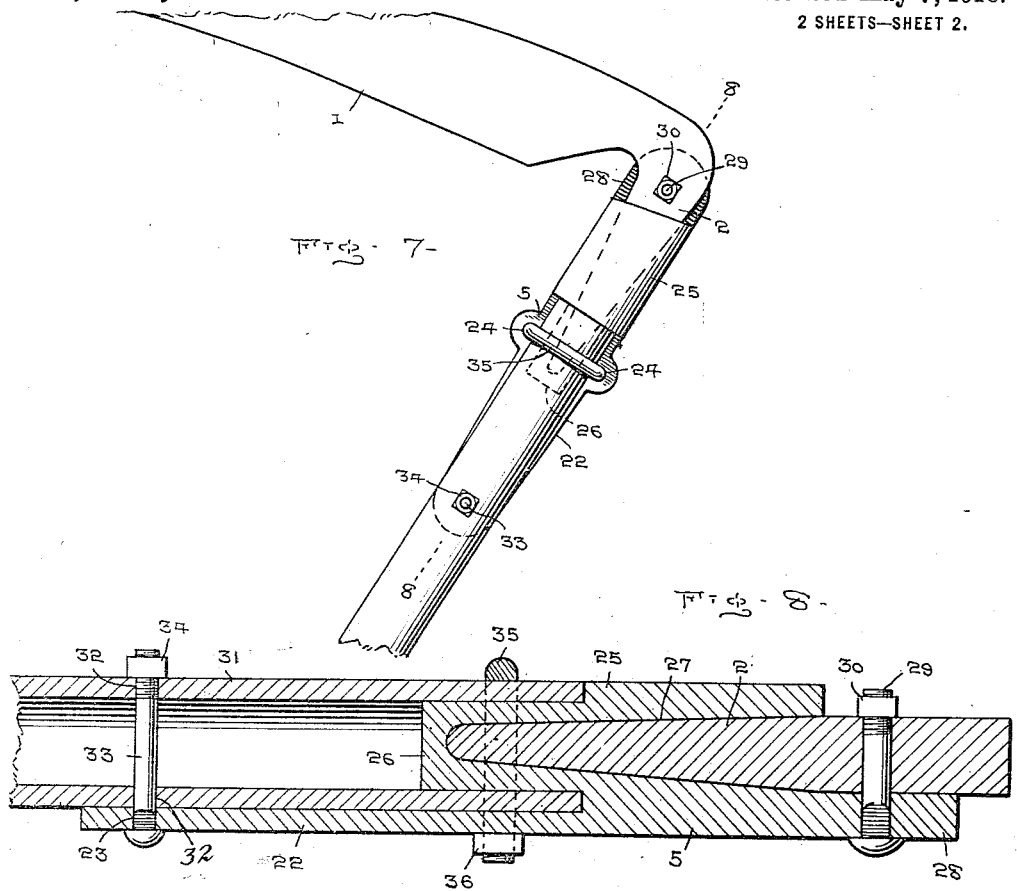
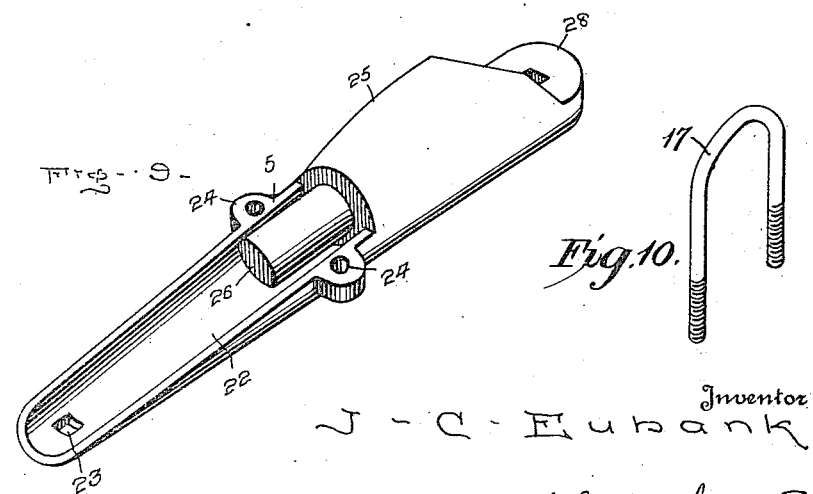
Inventor
J. C. Eubank
By W. J. FitzGerald & Co.
Attorneys

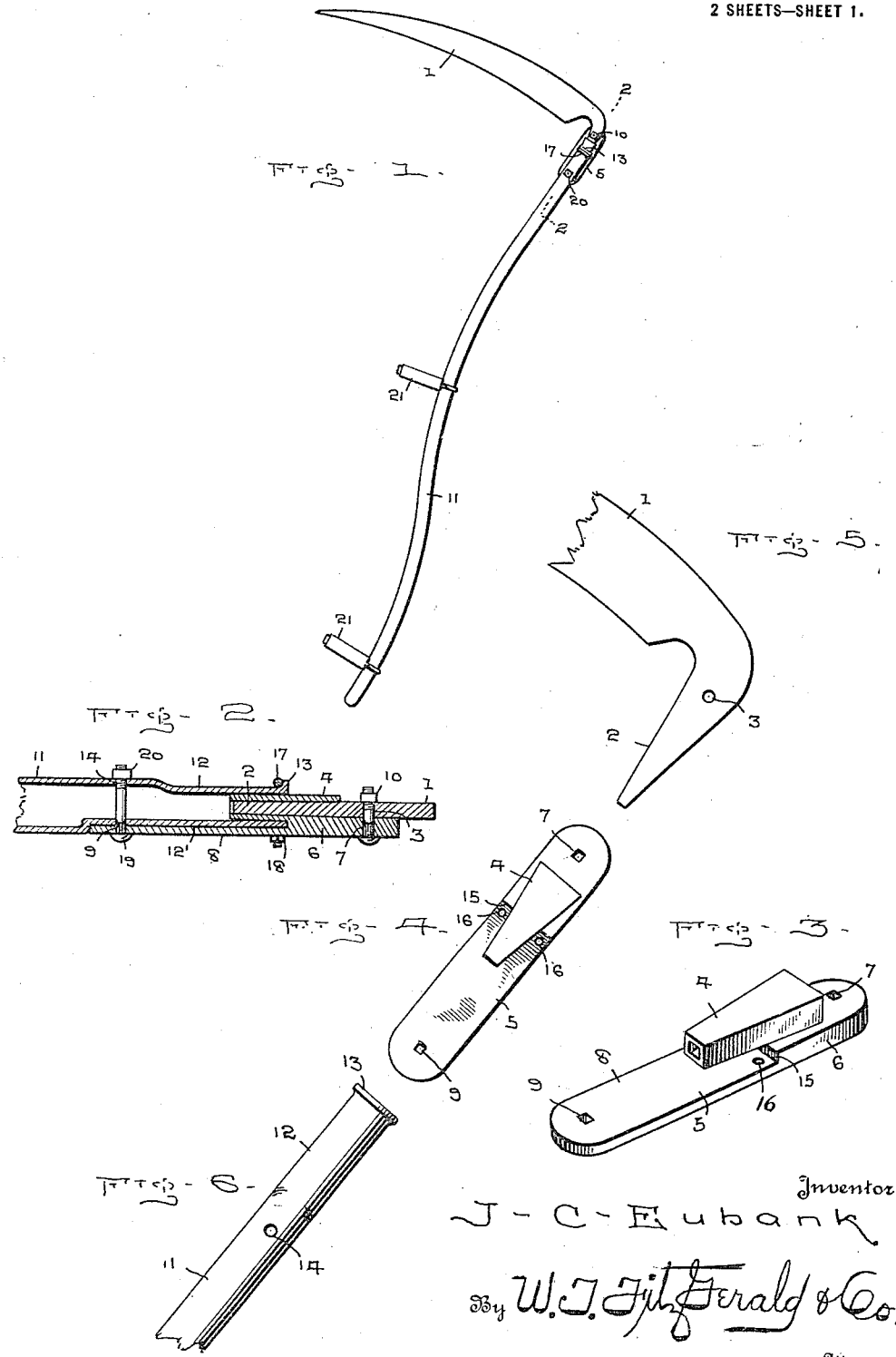

UNITED STATES PATENT OFFICE.

JOHN C. EUBANK, OF CAMPBELLSVILLE, KENTUCKY.

SCYTHE.

1,265,635.

Specification of Letters Patent.

Patented May 7, 1918.

Application filed February 9, 1917. Serial No. 147,653.

*To all whom it may concern:*

Be it known that I, JOHN C. EUBANK, a citizen of the United States, residing at Campbellsville, in the county of Taylor and State of Kentucky, have invented certain new and useful Improvements in Scythes; and I do hereby declare the following to be a full, clear, and exact description of the invention, such as will enable others skilled in the art to which it appertains to make and use the same.

This invention relates to the class of harvesters, and more particularly to a scythe.

The principal object of the invention is the provision of a scythe embodying a handle and a blade, novel means being provided for detachably connecting the blade with the handle.

Another object of the invention is the provision of a coupling member including a socket adapted to receive the blade shank, the shank being securely fastened to the coupling member, and a handle having a tubular open end adapted to receive the socket and be securely attached upon the coupling member.

A further object of the invention is the provision of a pliable pipe handle having detachably connected to one end thereof a scythe blade, said pliable pipe permitting of the handle to be bent in any desired shape.

A still further object of the invention is to improve and simplify the construction of devices of this character, so as to be reliable and efficient in use, of comparatively inexpensive construction and of durable and substantial design.

With these and other objects in view as will appear as the description proceeds, the invention comprises the various novel features of construction, combination and arrangement of parts as will be more fully described hereinafter, and set forth with particularity in the appended claims.

Referring to the drawings,

Figure 1 represents a side elevation of my improved scythe.

Fig. 2 is a vertical longitudinal section taken on the line 2—2 of Fig. 1.

Fig. 3 is a detail perspective view of the coupling member.

Fig. 4 is a plan view thereof,

Fig. 5 is a detail plan view of the scythe blade shank, and

Fig. 6 is a detail plan view of the forward end portion of the scythe.

Fig. 7 is a fragmentary side elevation showing another form of coupling member arranged in operative position.

Fig. 8 is a longitudinal sectional view taken on the line 8—8 of Fig. 7.

Fig. 9 is a detail perspective view of the coupling member.

Fig. 10 is a detail perspective view of the U-bolt clamp.

Similar characters of reference are used to denote like parts throughout the accompanying drawings and the following description.

Referring more particularly to the drawings, my improved and novel construction of scythe is shown to consist of the usual blade 1 having a tapered shank or heel portion 2 that is provided with an aperture 3, the purpose of which will presently appear.

The tapered shank 2 is adapted to be inserted within a socket 4 for frictional engagement therewith, said socket being carried by a coupling member 5, and in this instance I have preferably shown the socket member formed integral with and upon the forward thickened portion 6 of the coupling member, this latter thickened portion being provided with an aperture 7 extending vertically therethrough which in this instance is shown to be square for a purpose to be presently set forth. The rear and greater portion 8 of the coupling member 5 is slightly less in thickness than the forward portion as clearly shown in Fig. 3 of the drawings, and the rear end portion thereof is provided with an aperture 9, which in this instance is shown to be square.

In assembling the device and after the tapered shank 2 has been inserted within the socket 4, a securing bolt 10 having a non-circular or square shank is inserted upwardly through the aperture 7 of the coupling member and through the aperture 3 of the shank, the bolt being further provided with a nut whereby the shank 2 may be rigidly and securely held in position within the socket and upon the forward thickened portion 6 of the coupling member.

I further provide a handle 11, which is preferably constructed of a hollow piece of pliable pipe having its forward end portion slightly reduced as indicated by the numeral 12, and flattened on its under side as indicated by the numeral 12' and formed with an upturned end 13. The handle is further provided with an aperture 14 slightly in rear and adjacent the forward reduced portion 12. In further assembling the device, the hollow handle 11 is positioned upon the rear portion 8 of the coupling member and moved forwardly thereon until the rear end of the tapered socket 4 is positioned frictionally within the hollow reduced end 12, or in other words until the upturned end 13 is substantially flush against the shoulder 15 formed by the difference in thickness between the forward and rear portion 7 and 8 of the coupling member. The coupling member is also provided on opposite sides and adjacent the shoulder 15 with apertures 16 through which are designed to be passed the lower ends of a U-bolt 17 that embraces the forward end portion of the handle immediately in rear of the upturned end 13 thereof, the lower ends of the U bolt 17 being provided with suitable nuts 18 whereby the forward end portion 12 of the handle may be securely clamped and retained in position upon the coupling member.

In order to securely attach the rear end of the portion 8 to the handle, a securing bolt 19 having a squared shank is passed upwardly through the aperture 9 and through the aperture 14 of the handle, the upper end thereof being provided with a clamping nut 20 whereby the handle may be securely and effectively attached to the coupling member.

The handle 11 is provided with hand grips 21 whereby the scythe may be readily grasped in order to manipulate it. By making this handle 11 of a piece of pliable or bendable pipe, it will be possible to bend the handle into any desired shape, or to that shape which is found most convenient to the particular person using the scythe.

In Figs. 7, 8 and 9 will be seen another way in which my improved coupling member 5 may be made. This particular coupling member 5 is shown to consist of a rearwardly extending concavo convex supporting arm 22, that is formed adjacent its rear end portion with a non-circular aperture 23, and is formed adjacent its forward end with a pair of apertured ears 24 disposed diametrically opposite to one another.

The forward portion 25 of the coupling member is enlarged and is formed with a rearwardly extending reduced circular extension 26 that is disposed concentrically of the concavo-convex supporting arm. This enlarged forward portion 25 and the extension 26 are provided with a tapered socket 27 designed to receive the tapered shank or heel portion 2 of the scythe blade 1.

Extending from the lower forward portion of the enlarged portion 25 is an apertured ear 28, the upper surface of which lies in the same plane as the bottom of the socket 27, while the lower surface lies in the same plane with the bottom of the coupling member. As shown the aperture extending through the ear 28 is non-circular and is designed to receive a carriage bolt 29 or other bolt having a squared shank, this bolt extending upwardly through the ear and the blade shank 2 and is provided with a retaining nut 30 whereby the blade shank may be firmly clamped within the socket and upon the apertured ear.

The handle 31, which as before stated, is designed to be of pliable pipe, is so positioned with respect to the coupling member that the forward end portion of the pipe handle receives the reduced circular extension 26, this extension 26 being so positioned that when it is disposed within the end of the pipe handle, the latter will rest in the concavo-convex supporting arm. The pipe handle is provided with a pair of diametrically opposite apertures 32 designed to receive the shank of a carriage bolt 33 or other similar bolt having a squared shoulder, which bolt is passed upwardly through the non-circular aperture 23 of the supporting arm 22 and is provided on its upper end with a retaining nut 34, whereby the handle may be securely clamped to the coupling member.

In order to rigidly retain the forward end portion of the handle in position in a more secure manner, I provide a U shaped clip bolt 35, which embraces the pipe handle and has its arms extending downwardly through the apertured ears 24 and are each provided with a retaining nut 36, whereby the extreme end portion of the pipe handle may be securely fastened to the coupling member in an operative position.

If found desirable the concavo-convex supporting arm 22 may be made slightly wider, as for instance, if a scythe were being used that had a wooden handle and the same should become worn or loose in its connection with the blade, the wooden handle can be removed from the blade, the end cut off and a hole bored in the end large enough to receive the reduced circular extension 26, from which it will be seen that the wooden handle can be inserted over the extension 26 so as to rest in position upon the concavo convex supporting arm, where it may be secured in position the same way that the pipe handle is secured.

From the foregoing description it will be apparent that I have provided a novel construction of scythe wherein the various parts will be effectively and securely maintained in their respective position, and one which is of durable and substantial design, and of cheap and inexpensive construction. By using bolts having square shanks, they will be prevented from turning and thus eliminate any tendency to cause the adjacent parts which they connect together from becoming loose and causing an undue amount of wear between the parts.

What I claim is:—

1. A scythe comprising a blade having a tapered shank, a coupling member, a socket carried by said member intermediate its ends and adapted to receive said tapered shank, means for securing said tapered shank to the coupling member, a tubular handle adapted to be positioned on the coupling member and receive one end of said socket, and means for securing said handle to the coupling member.

2. A scythe comprising a blade having a tapered shank, a coupling member consisting of an enlarged forward portion having a reduced extension, both of which are formed with a single tapered socket, an apertured ear extending from said enlarged portion adapted to coöperate with said socket to support said tapered shank, securing means extending through said ear and shank, the rear end portion of said coupling member consisting of a concavo-convex supporting arm, said reduced extension disposed concentrically of said supporting arm, a pipe handle adapted to be engaged over said reduced extension and rest in said concavo-convex supporting arm, and means for securing the pipe handle to the coupling member.

3. A scythe comprising a blade having a tapered shank, a coupling member consisting of a forward portion having a reduced extension, both of which are formed with a single tapered socket, an apertured ear extending from said enlarged portion adapted to coöperate with said socket to support said tapered shank, securing means extending through said ear and shank, the rear end portion of said coupling member consisting of a concavo-convex supporting arm, said reduced extension disposed concentrically of said supporting arm, a pipe handle adapted to be engaged over said reduced extension and rest in said concavo-convex supporting arm, a U-bolt embracing said handle and extending through said ears, nuts for the free ends of said U-bolt, and a clamping bolt disposed through said handle and the rear end of said supporting arm.

In testimony whereof I have signed my name to this specification in the presence of two subscribing witnesses.

JOHN C. EUBANK.

Witnesses:
HENRY R. TURNER,
OLIVER MURRELL.